United States Patent [19]

Trott

[11] Patent Number: 5,507,498
[45] Date of Patent: Apr. 16, 1996

[54] SEALING DEVICE FOR POLYMER FILTRATION APPARATUS

[75] Inventor: Delano B. Trott, Danvers, Mass.

[73] Assignee: Synergy Extrusion Technologies, Inc., Woburn, Mass.

[21] Appl. No.: 135,671

[22] Filed: Oct. 13, 1993

[51] Int. Cl.⁶ .............................. F16J 9/00; F16J 15/00; F21B 33/00
[52] U.S. Cl. ...................... 277/1; 210/352; 210/398; 264/169; 425/190; 425/199; 277/119; 277/122; 277/143; 277/216
[58] Field of Search ........................ 210/352, 398; 264/169; 425/190, 197, 198, 199; 277/1, 119, 122, 143, 216, 142

[56] References Cited

U.S. PATENT DOCUMENTS

| 3,962,092 | 6/1976 | Newman, Jr. | 210/236 |
|---|---|---|---|
| 4,059,525 | 11/1977 | Krasnow | 210/236 |
| 4,359,387 | 11/1982 | Trott | 210/352 |
| 4,470,607 | 9/1984 | Schier et al. | 277/119 |
| 5,380,018 | 1/1995 | Mader et al. | 277/216 |

FOREIGN PATENT DOCUMENTS

| 331691 | 5/1903 | France | 277/142 |
|---|---|---|---|
| 1394535 | 2/1965 | France | |
| 1490131 | 7/1967 | France | |
| 2356445 | 1/1978 | France | |
| 86/07279 | 12/1986 | WIPO | |

OTHER PUBLICATIONS

"Beringer Self-Lock Screen Changer", brochure from Beringer Co. (1989, Jan.).
"Slide Plate Screen Changers—Understanding Screen Changers, a Buyer's Manual," The Berlyn Corp. (1976).

Primary Examiner—William A. Cuchlinski, Jr.
Assistant Examiner—Keith Hwang
Attorney, Agent, or Firm—Hamilton, Brook, Smith & Reynolds

[57] ABSTRACT

A sealing device for sealing a slide plate translatable across an extrusion bore in a polymer filtration apparatus includes an annular seal having a sealing surface which is biased against the slide plate by an annular spring. The seal has a thrust surface which is angled relative to the sealing surface and is located at an opposite axial end of the seal from the sealing surface. The annular spring exerts radial forces against the thrust surface of the seal to bias the seal in an axial direction against the slide plate. Pressurized polymer in the extrusion bore further biases the seal against the slide plate.

8 Claims, 6 Drawing Sheets

SEALING DEVICE FOR POLYMER FILTRATION APPARATUS

BACKGROUND

Screen changers for use in polymer extrusion processes include a slide plate housed within a housing. The slide plate contains filter elements for filtering polymer and is translatable across an extrusion bore of an extruder apparatus. The surfaces of the slide plate contact and are sealed by a stationary downstream seal and a moveable upstream seal to prevent polymer from leaking from the extrusion bore between the slide plate and the housing. The upstream seal is generally biased against the slide plate surface to provide proper sealing conditions.

One current method of biasing the upstream seal against the slide plate is to thread the seal into the housing and rotate the seal with a wrench to adjust the seal axially into contact with the slide plate. A problem with this approach is that operator skill is required to ensure that the seal is tightened sufficiently to prevent polymer leakage but not so tight as to impede slide plate movement. Additionally, frequent readjustment is required to compensate for seal and slide plate wear.

Another method of biasing the upstream seal against the slide plate is disclosed in U.S. Pat. No. 3,962,092. Here the upstream seal is a free moving pressure actuated seal which is biased against the slide plate by the pressure of polymer within the extrusion bore. Such sealing systems have not provided consistent sealing.

Another method is disclosed in U.S. Pat. No. 4,359,387 in which the upstream seal is biased against the slide plate with a belleville spring. The disadvantage of this design is that the spring must exert a force great enough to ensure sealing under the worst-case design conditions such as pressures up to 10,000 psi. As a result, under most operating conditions the seal force is substantially greater than required, accelerating seal wear and necessitating additional power to move the slide plate.

Still another current method is to bias the upstream seal against the slide plate with an expandable polymer ring. The upstream seal has a conical surface at the upstream end which contacts a cooperating conical face on the ring. The ring is axially and radially confined by the seal and housing. The ring is made of a polymeric material with a coefficient of thermal expansion greater than the metal housing surrounding it such that, when the extruder is raised to operating temperature, the polymeric ring expands radially outward, wedging the upstream seal into initial contact with the slide plate. Further, under operating conditions polymer pressure acts on the internal surface of the ring, forcing the ring radially outward and wedging the upstream seal into tighter contact with the slide plate proportionate to the polymer pressure. The disadvantage of this design is that it relies on a polymeric material which is subject to thermal degradation and a decrease in properties at temperatures often encountered in extrusion processes. Generally, polymeric rings do not operate well at temperatures above 500° F.

SUMMARY OF THE INVENTION

Accordingly, there is a need for a low maintenance, low wear sealing device which can seal the slide plate at low as well as high polymer pressures and at temperatures above 500° F.

The present invention provides a sealing device for sealing a slide plate in a polymer filtration apparatus. The sealing device includes an annular seal having a sealing surface which abuts against the slide plate. The slide plate is translatable across an extrusion bore. The seal has a thrust surface located at an opposite axial end of the seal from the sealing surface. A spring biases the sealing surface of the seal against the slide plate. As pressure of polymer in the bore increases, the seal is further biased against the slide plate.

In preferred embodiments, the spring is an annular spring which contacts and exerts radial forces against the thrust surface of the seal. The thrust surface is angled relative to the sealing surface and acts as a cam to bias the seal in an axial direction against the slide plate. The pressure of the polymer forces the spring against the thrust surface of the seal to further bias the seal against the slide plate. Pressurized polymer can also act directly on the exposed thrust surface of the seal to further bias the seal against the slide plate. The spring is retained within a seating bore and has an outer diameter and an inner diameter. A gap is formed within the spring extending across a region between the outer diameter and the inner diameter of the spring to permit inward flexing of the spring when it is positioned within the seating bore against the seal. A liner covers the inner diameter of the spring to minimize irregularities in the flow surface. The liner includes an opening located at an axial end for permitting polymer to enter the opening to equalize pressure surrounding the liner.

The present invention provides a low maintenance sealing device which biases the seal against the slide plate with enough force to prevent polymer within the extrusion bore from leaking when polymer pressure is low but light enough force so that the slide plate can be translated without causing considerable wear or damage to the seal or slide plate. However, when the pressure of the polymer within the extrusion bore increases, the pressure of the polymer biases the seal against the slide plate with greater force to prevent polymer from leaking. Additionally, the spring and seal of the sealing device, which are preferably metal, are capable of operating at temperatures above 500° F.

BRIEF DESCRIPTION OF THE DRAWINGS

The foregoing and other objects, features and advantages of the invention will be apparent from the following more particular description of preferred embodiments of the drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

Figure 1:
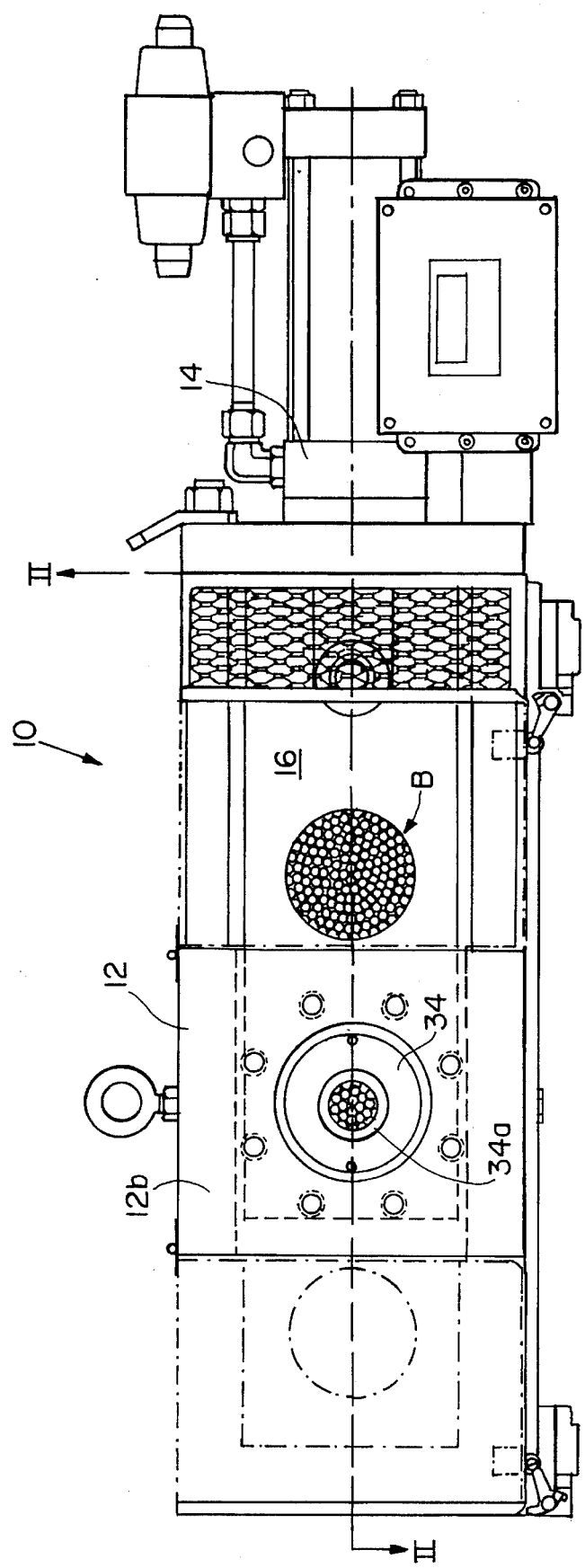
FIG. 1 is a front view of a polymer filtration apparatus including the present invention sealing device.
Figure 2:
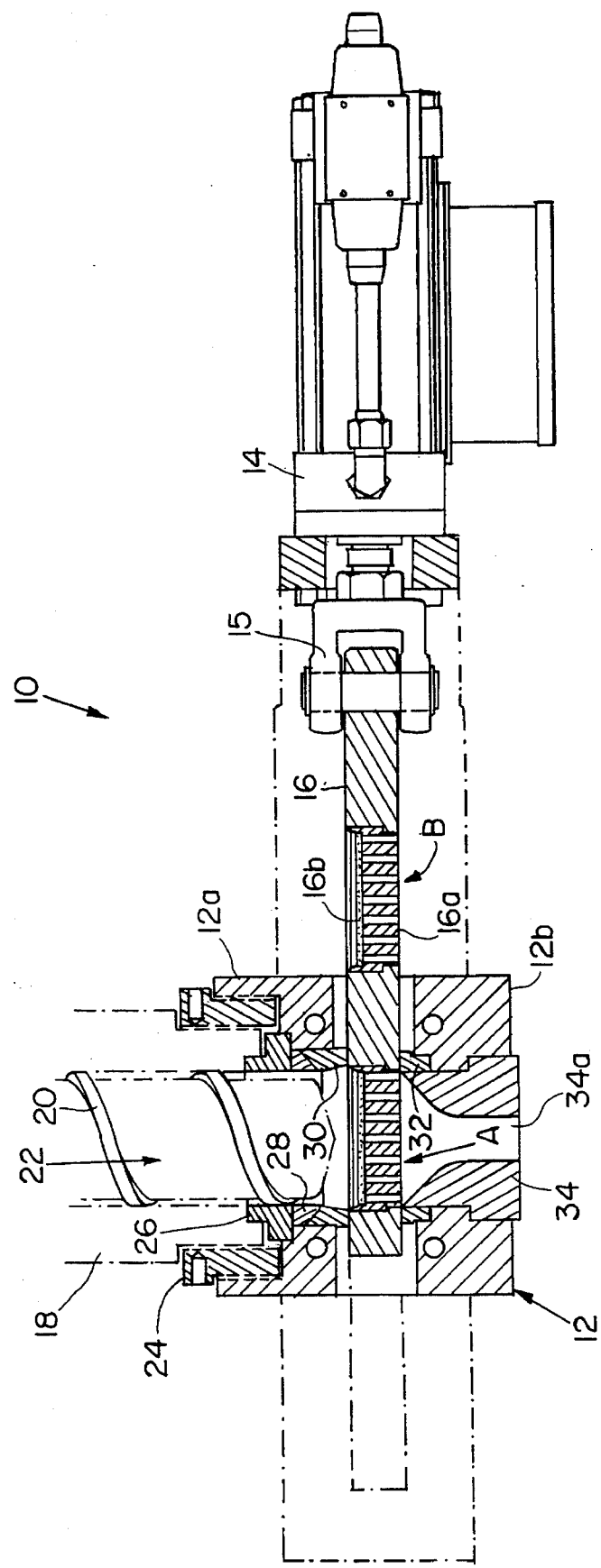
FIG. 2 is a partial top sectional view of the polymer filtration apparatus of FIG. 1 taken along lines II—II showing the present invention sealing device.
Figure 3:
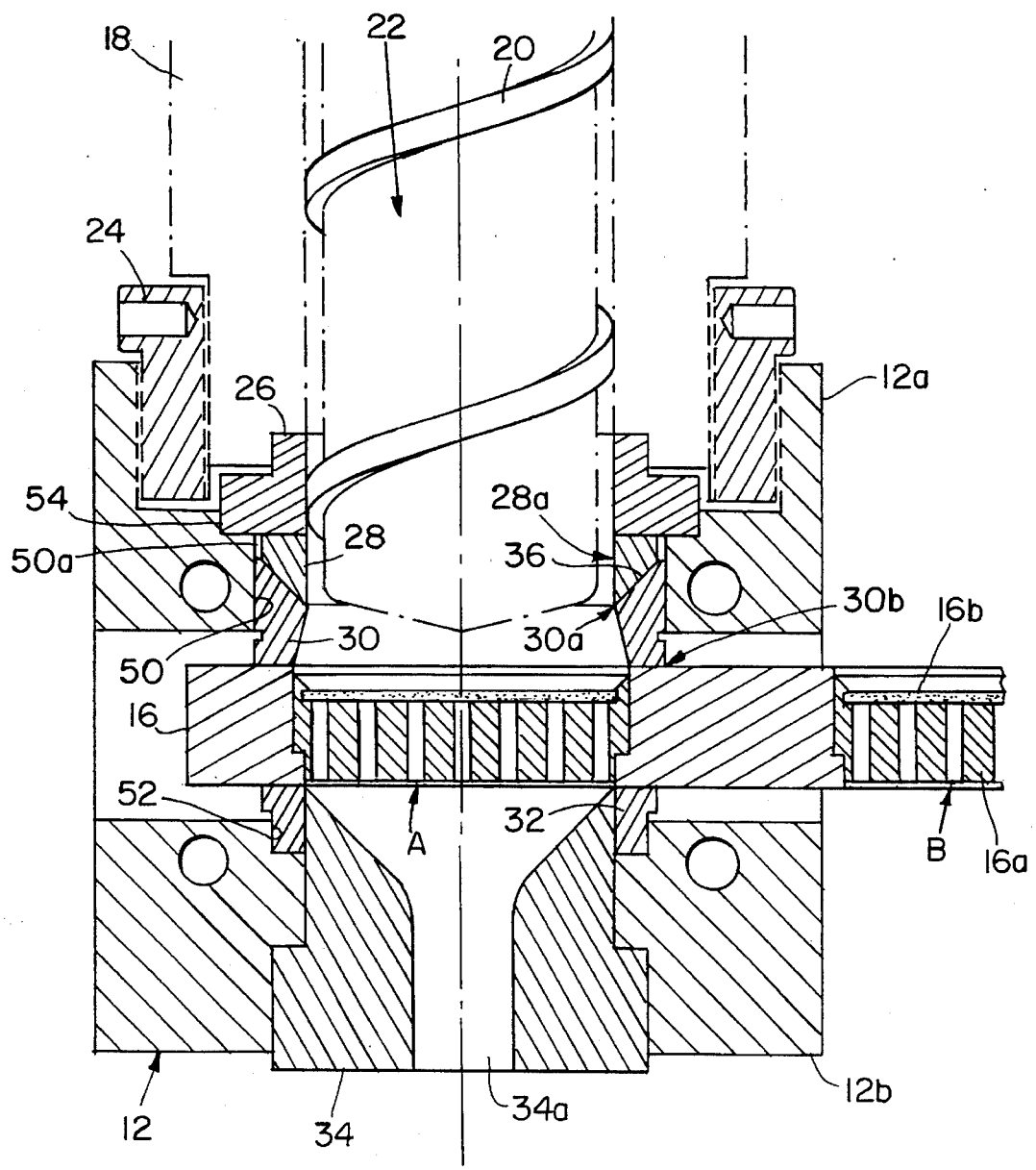
FIG. 3 is an enlarged top sectional view of the present invention sealing device.

In FIGS. 1, 2 and 3, screen changer 10 is similar to that disclosed in U.S. patent application Ser. No. 08/087,215. Screen changer 10 includes a housing 12 having a tapering bore 22 which is affixed to an extruder 18 proximate to the extruder screw 20 by adapter 24. Bore adapter 34 has a tapered bore 34a which provides a smooth transition between bore 22 and the bore of equipment downstream from housing 12. Housing 12 includes an upstream block 12a and a downstream block 12b. Slidably attached within housing 12 is a slide plate 16. Slide plate 16 is connected by a coupling member 15 to a hydraulic cylinder 14 which actuates the movement of slide plate 16. Slide plate 16 houses two filter assemblies A and B for filtering polymer exiting extruder 18. Each filtering region contains a breaker plate 16a positioned on a step, there being a number of holes formed within the plate, and a replaceable filter element 16b. The surfaces of slide plate 16 which border the filtering regions provide closed sealing surfaces for the filtering regions.

The sealing surfaces of slide plate 16 are sealed by a downstream seal 32 and an upstream seal 30. Upstream seal 32 and downstream seal 30 are positioned within bores 50 and 52 respectively to prevent polymer flowing through bore 22 from leaking to the atmosphere during normal operation. Upstream seal 30 is biased against slide plate 16 by spring 28 which is also positioned within bore 50. Upstream seal 30 and spring 28 are retained in position by a retaining ring 26 seated in bore 54.

In operation, hydraulic cylinder 14 moves slide plate 16 to position either filter assembly A or B in alignment with bore 22 in order to filter impurities from polymer flowing through bore 22.

Spring 28 exerts a radial force upon thrust surface 30a of seal 30. Thrust surface 30a is angled relative to sealing surface 30b and biases sealing surface 30b against slide plate 16. Thrust surface 30a acts as a cam to translate the radial force from spring 28 into axial movement of seal 30 against slide plate 16. Spring 28 biases seal 30 against slide plate 16 with enough force to prevent low pressure polymer within bore 22 from leaking to the atmosphere between slide plate 16 and seals 30 and 32. This force is light enough to allow slide plate 16 to be translated without damaging or accelerating the wear of slide plate 16 or seals 30 and 32 when the pressure of polymer within bore 22 is low.

As the pressure of polymer in bore 22 increases, the pressurized polymer exerts a force upon surface 28a of spring 28, thereby creating an additional radial force of spring 28 upon thrust surface 30a. This further biases seal 30 against slide plate 16 with a force proportional to the pressure of polymer within bore 22, to prevent the higher pressure polymer from leaking between slide plate 16 and seals 30 and 32.

If spring 28 is not completely circular in shape, the chamfered surface 36 of spring 28 contacts thrust surface 30a only along portions of chamfered surface 36 which are circular. As a result, gaps can exist between chamfered surface 36 and thrust surface 30a through which polymer enters and contacts thrust surface 30a. The polymer which contacts thrust surface 30a can also further bias seal 30 against slide plate 16 with a force proportional to the polymer pressure.

Figure 4:
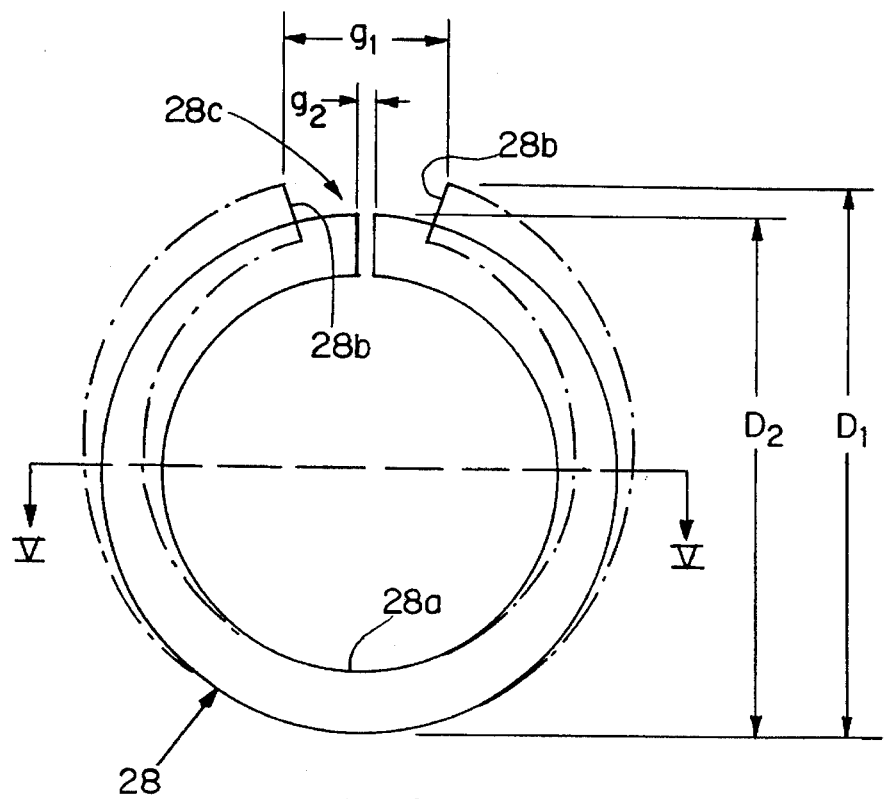
FIG. 4 is a front view of one preferred embodiment of the annular spring.
Figure 5:
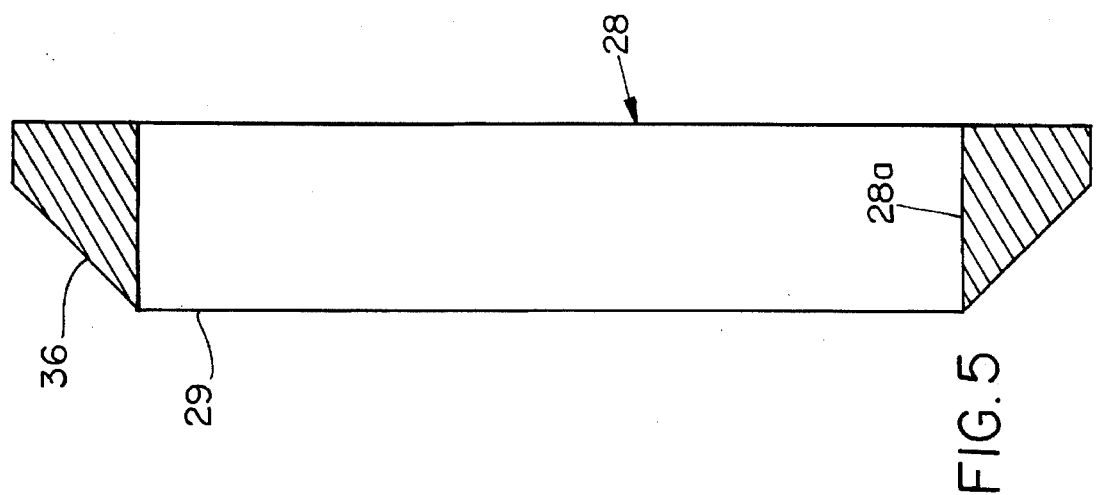
FIG. 5 is a sectional view of FIG. 4 taken along lines V—V.

A more detailed view of spring 28 is given in FIGS. 4 and 5. Spring 28 is preferably a metallic ring having an initial diameter $D_1$. A chamfered surface 36 is formed on the front axial surface 29 of spring 28 which mates with thrust surface 30a of seal 30 (FIG. 3). In the preferred embodiment, chamfered surface 36 is preferably at a 45° angle. However, this angle can be varied. A space 28c is formed within spring 28 to form gap $g_1$ between ends 28b.

In the preferred embodiment, space 28c is cut from spring 28 but alternatively can be formed by other suitable methods such as molding or casting. The initial diameter $D_1$ of spring 28 is smaller than the diameter of bore 50 for easy assembly. This leaves a gap 50a between bore 50 and spring 28. When spring 28 is initially positioned within bore 50, spring 28 extends slightly beyond bore 50 into bore 54. As a result, when retaining ring 26 is secured within bore 54, spring 28 is forced against thrust surface 30a which compresses spring 28 radially inward to a smaller, deflected diameter of D2. This compresses ends 28b closer together to form a smaller, deflected gap $g_2$. In the preferred embodiment, initial gap $g_1$, spans across approximately 10°–20° of the circumference of spring 28. Additionally, initial diameter $D_1$ is approximately ¼ to ½inches larger than deflected diameter $D_2$. Alternatively, the initial diameter $D_1$ of spring 28 can be larger than the diameter of bore 50 so that spring 28 must be compressed radially inward before being positioned within bore 50.

When deflected, spring 28 deforms close to a circular shape (within a few thousandths of an inch) and exerts a radial force upon thrust surface 30a of seal 30. Spring 28 provides enough deflection to exert a near constant radial force while compensating for variations in the axial position of the seal due to manufacturing variations of up to ± 0.020 of an inch. Spring 28 is preferably made of steel but can be made of other suitable metals such as bronze, brass and aluminum or composites such as graphite epoxy. The use of different materials for spring 28 changes the spring characteristics of spring 28. Additionally, the spring characteristics can also be changed by changing the cross-sectional configuration of spring 28. Although space 28c is shown to be an angular sector removed from spring 28, space 28c can be of other suitable configurations such as a spiral shape.

Figure 7:
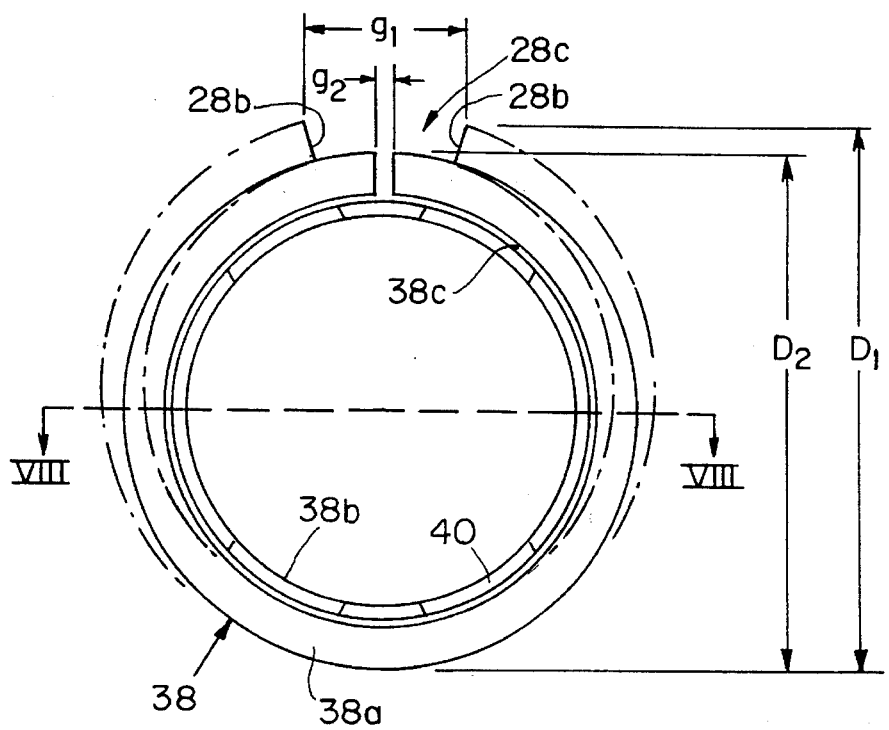
FIG. 7 is a rear view of another preferred embodiment of the annular spring.
Figure 8:
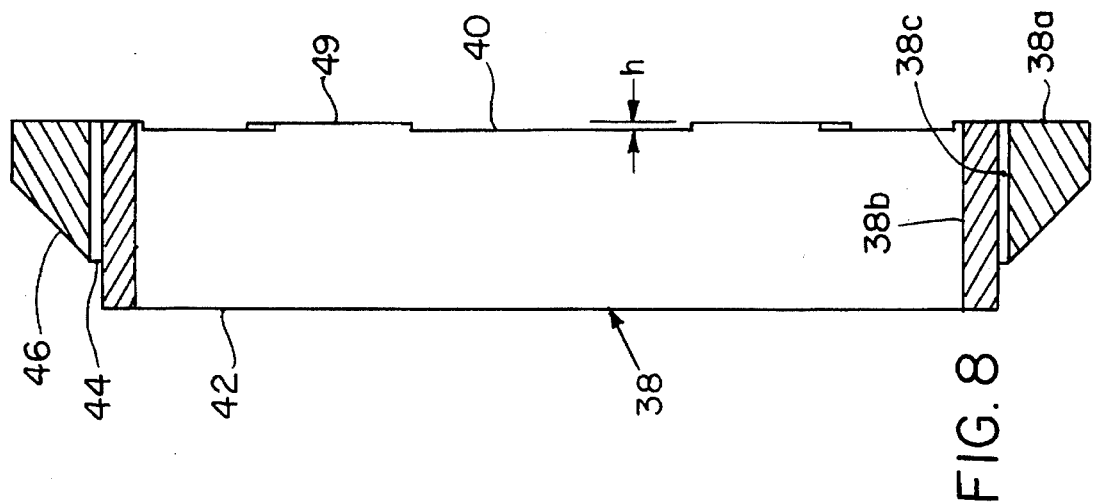
FIG. 8 is a sectional view of the spring in FIG. 7 taken along lines VIII—VIII.
Figure 6:
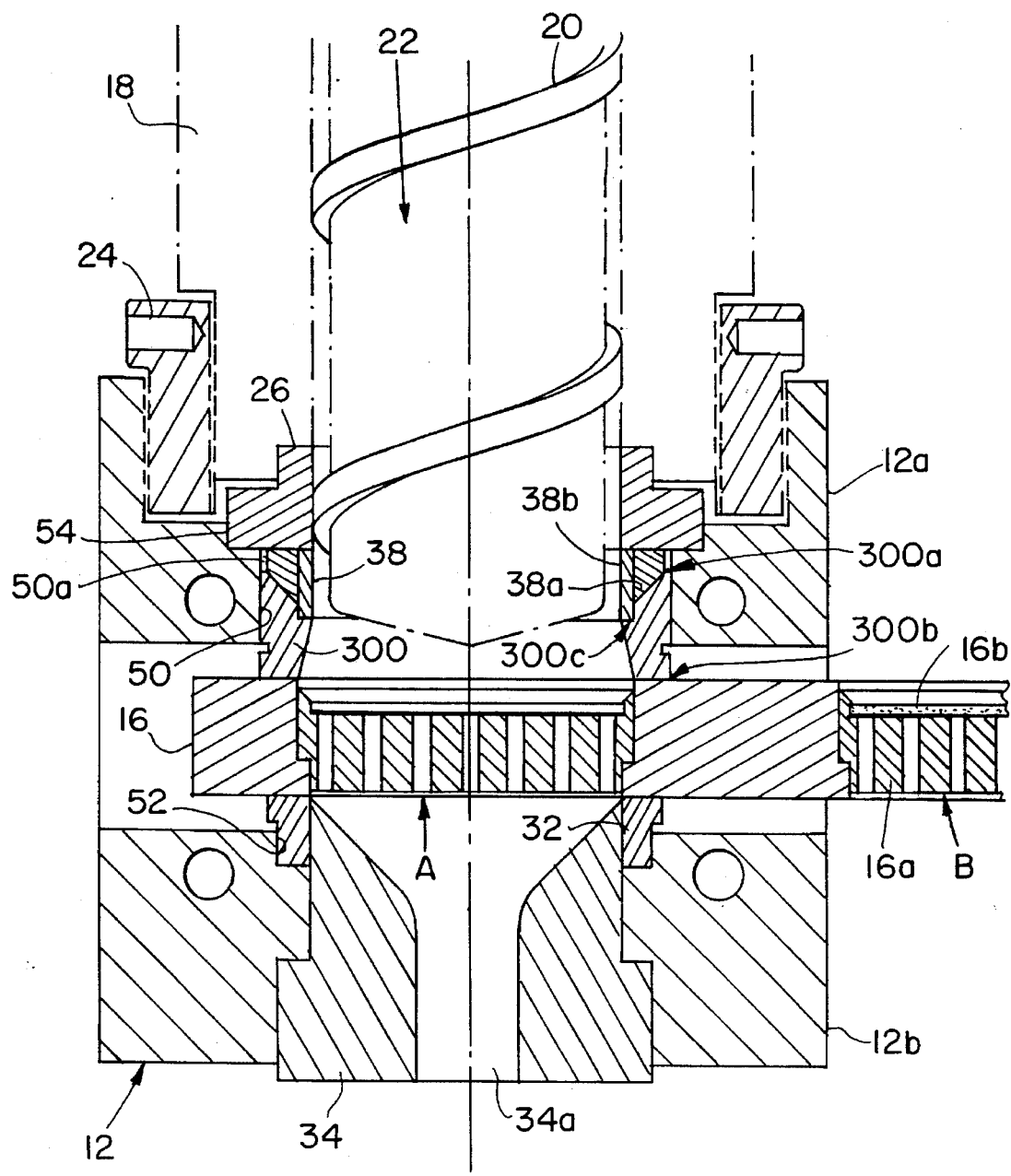
FIG. 6 is an enlarged top sectional view of another preferred embodiment of the present invention sealing device.

Referring to FIG. 6, in another preferred embodiment of the present invention, spring 38 is substituted for spring 28. Spring 38 is positioned within bore 50 against seal 300 and retained by retaining ring 26. Spring 38 operates in the same manner as spring 28. A more detailed view of spring 38 is given in FIGS. 7 and 8.

Spring 38 includes an annular spring portion 38a and a liner 38b. The annular spring portion 38a biases seal 300 against slide plate 16 in the same manner as spring 28. Liner 38b is preferably made of metallic material such as steel and isolates spring portion 38a from direct polymer flow by covering the inner diameter of spring portion 38a, and particularly space 28c to minimize irregularities in the flow surface. Chamfered surface 46, formed on the front axial surface 44 of spring portion 38a mates with thrust surface 300a of seal 300. The front axial portion 42 of liner 38b mates with bore 300c of seal 300. This radially positions liner 38b with respect to seal 300. A series of shallow slots 40 are formed on the rear axial surface 49 of liner 38b. Polymer passes through slots 40 to exert a force upon surface 38c of spring portion 38a, thereby creating an additional radial force of spring portion 38*a* upon thrust surface 300*a*. Slots 40 preferably have a depth "h" of about 0.005 to 0.015 inches. Alternatively, the depth "h" can be varied.

Equivalents

While this invention has been particularly shown and described with references to preferred embodiments thereof, it will be understood by those skilled in the art that various changes in form and details may be made therein without departing from the spirit and scope of the invention as defined by the appended claims. For example, springs of other suitable shapes can be employed to bias seals 30 and 300 against slide plate 16.

What is claimed is:

1. A sealing device for sealing a slide plate in a polymer filtration apparatus, the sealing device comprising:

an annular seal having a sealing surface which abuts against the slide plate, the slide plate being translatable across an extrusion bore, the seal having a thrust surface located at an opposite axial end of the seal from the sealing surface; and a spring contacting the thrust surface of the seal for biasing the sealing surface of the seal against the slide plate, increasing pressure of polymer in the bore further forcing the spring against the thrust surface of the seal causing the seal to be further biased against the slide plate.

2. The sealing device of claim 1 in which the spring is an annular spring for exerting radial forces against the thrust surface, the thrust surface being angled relative to the sealing surface.

3. The sealing device of claim 2 in which the spring is retained within a seating bore and has an outer diameter and an inner diameter, the spring further comprising a gap formed within the spring extending across a region between the outer diameter and the inner diameter of the spring.

4. A sealing device for sealing a slide plate in a polymer filtration apparatus, the sealing device comprising:

an annular seal having a sealing surface which abuts against the slide plate, the slide plate being translatable across an extrusion bore, and a thrust surface angled relative to the sealing surface and located at an opposite axial end of the seal from the sealing surface; and an annular spring for contacting and exerting radial forces against the thrust surface of the seal to bias the seal in an axial direction against the slide plate, increasing pressure of polymer in the bore further forcing the spring against the thrust surface of the seal causing the seal to be further biased against the slide plate.

5. The sealing device of claim 4 in which the spring is retained within a seating bore and has an outer diameter and an inner diameter, the spring further comprising a gap formed within the spring extending across a region between the outer diameter and the inner diameter of the spring.

6. A method of sealing a slide plate in a polymer filtration apparatus comprising the steps of:

abutting a sealing surface of an annular seal against the slide plate, the slide plate being translatable across an extrusion bore;

biasing the sealing surface of the seal against the slide plate with an annular spring, the spring contacting a thrust surface of the seal and exerting forces radially against the thrust surface of the seal to bias the seal in an axial direction against the slide plate; and further biasing the sealing surface of the seal against the slide plate by further forcing the spring against the thrust surface of the seal with pressurized polymer.

7. A method for sealing a slide plate in a polymer filtration apparatus comprising the steps of:

abutting a sealing surface of an annular seal against the slide plate, the slide plate being translatable across an extrusion bore;

biasing the sealing surface of the seal against the slide plate with a spring contacting the seal; and further biasing the sealing surface of the seal against the slide plate by further forcing the spring against the seal with pressurized polymer.

8. The method of claim 7 in which the spring is annular and exerts forces radially against the thrust surface of the seal, the thrust surface being angled relative to the sealing surface.

* * * * *